Patented Apr. 17, 1928.

1,666,811

UNITED STATES PATENT OFFICE.

JAN HENDRIK DE BOER, OF EINDHOVEN, NETHERLANDS, ASSIGNOR TO N. V. PHILIPS' GLOEILAMPENFABRIEKEN, OF EINDHOVEN, NETHERLANDS.

SEPARATION OF HAFNIUM AND ZIRCONIUM.

No Drawing. Application filed August 10, 1926, Serial No. 128,517, and in the Netherlands September 12, 1925.

This invention has reference to a process of separating hafnium and zirconium and more particularly to a process of separating the phosphates of hafnium and zirconium. Applicant has found that the separation of hafnium and zirconium can be ensured by starting from a solution that can be obtained by bringing a mixture of their phosphates in a medium containing concentrated sulphuric acid and then subjecting said solution to a fractional precipitation. For this purpose a determined quantity of a precipitant, water, for example, may be added to the concentrated sulphuric acid solution. In this case a mixture of hafnium phosphate and zirconium phosphate is precipitated which contains relatively more hafnium than the sulphuric acid solution. In order to ensure a proper separation by this method it is necessary that the precipitant should not be added in excess to the sulphuric acid solution so that the sulphuric acid is not diluted too much. Now, filtering the still strongly sulphuric acid solution has proved to be beset with difficulties since most filter agents, for example filter paper are attacked by strong sulphuric acid. The object of the invention is to obviate this difficulty.

According to the invention the process of separating hafnium and zirconium is brought about by starting from a solution of the phosphates of hafnium and zirconium which can be obtained by bringing a mixture of said phosphates in a medium containing concentrated sulphuric acid, and adding to the said solution at least one other salt of hafnium and zirconium, whereupon if necessary a precipitant is added.

Preferably the concentrated sulphuric acid solution of the phosphates should be mixed with a solution of at least one other salt of hafnium and zirconium in concentrated sulphuric acid, whereupon a precipitant is added. Water may be used successfully as a precipitant. This precipitation may proceed as follows. A precipitant is added in excess to the mixture so as to precipitate the totality of the phosphate present in the solution. The excess must be such that the concentrated sulphuric acid is sufficiently diluted to enable it to be filtered without difficulty. In contradistinction to the phosphate which is now precipitated quantitatively, hafnium and zirconium are only precipitated partially and for the remaining part they remain in solution vinculated to the other acid residue. Now the phosphate precipitated contains relatively more hafnium than the original concentrated sulphuric acid solution.

Moreover a separation may be effected by adding to the concentrated sulphuric acid phosphate solution a solution of at least one other salt of hafnium and zirconium in a dilute acid. In this case, simultaneously with the admixture of the said solutions, the phosphate of hafnium and zirconium precipitates from the solution.

The proportion of the quantity of phosphate and the quantity of other salt of hafnium and zirconium which it is desired to be used for carrying out this process depends on the question whether a radical separation with low proceeds or higher proceeds with a less effective separation is desired. In the first case the quantity of phosphate present in the strongly sulphuric acid solution should be smaller than in the latter case.

As hafnium and zirconium have proved to be most readily worked up in the form of phosphates from zirconium ores containing hafnium, phosphates will, as a rule, also be started with for the preparation of the other hafnium and zirconium salts to be added to the concentrated sulphuric acid phosphate solution. The said phosphates can be converted into other salts of hafnium and zirconium by introducing the mixture of hafnium and zirconium phosphates into a medium containing hydrofluoric acid, precipitating the oxides of hafnium and zirconium from the solution thus obtained by means of a basely reacting substance and if necessary converting the said oxides in an acid medium into other salts of hafnium and zirconium. The invention will be described in detail with reference to the following example of operation. A certain quantity of zirconium phosphate, containing hafnium, is started from and is divided into two approximately equal parts. One half is dissolved in concentrated sulphuric acid, the other half is treated with hydrofluoric acid, complex compounds being thus produced which are decomposed with a solution of caustic soda so as to form the oxides of hafnium and zirconium. These oxides are treated with concentrated sulphuric acid, which ensures the production of the sulphates of hafnium and zirconium. Then the sulphuric acid phosphate solution and the sulphuric acid sulphate solution are admixed, the phosphate is precipitated quantitatively from the mixture of the said solutions with a plentiful supply of water and this phosphate, which contains relatively more hafnium than the solution is filtered off. The phosphate rich in hafnium thus obtained is again divided into two parts and treated in the same manner as afore described.

It is not necessary to first treat the oxides of hafnium and zirconium with concentrated sulphuric acid and then to mix the solutions thus obtained with the concentrated sulphuric acid phosphate solution; obviously the oxides of hafnium and zirconium may be introduced directly into the concentrated sulphuric acid phosphate solution which also ensures the production of the sulphates.

Instead of treating the oxides of hafnium and zirconium with concentrated sulphuric acid they may be treated with a dilute acid, for example, dilute sulphuric acid, which also ensures the production of the sulphates of hafnium and zirconium. By then mixing the concentrated sulphuric acid phosphate solution with the dilute sulphuric acid sulphate solution, the phosphates of hafnium and zirconium are however already during the admixture preciptated by the water contained in the dilute sulphuric acid so that in this case a supplementary precipitant can be dispensed with. It has been found that by continuing in this manner a radical separation of hafnium and zirconium can be ensured the concentration of hafnium increasing materially at each stage. In the example just described the fractions obtained by four successive precipitations contain 9%, 16%, 26%, 35% of hafnium. If the zirconium phosphate containing hafnium which is to be separated is not divided into two equal parts but if the quantity of phosphate which is introduced directly into concentrated sulphuric acid is smaller than the quantity of phosphate converted into the other salt of hafnium and zirconium, the separation becomes still more effective although the proceeds are smaller.

What I claim is:—

1. A process of separating hafnium and zirconium by starting from a solution that can be obtained by bringing a mixture of phosphates of hafnium and zirconium in a medium containing concentrated sulphuric acid, characterized by adding to the said solution at least one other salt of hafnium and zirconium.

2. A process of separating hafnium and zirconium by starting from a solution that can be obtained by bringing a mixture of phosphates of hafnium and zirconium in a medium containing concentrated sulphuric acid, characterized by adding to the said solution at least one other salt of hafnium and zirconium in concentrated sulphuric acid whereupon a precipitant is added.

3. A process according to claim 1, characterized in that water is added as a precipitant.

4. A process according to claim 2, characterized in that water is added as a precipitant.

5. A process of separating hafnium and zirconium by starting from a solution that can be obtained by bringing a mixture of phosphates of hafnium and zirconium in a medium containing concentrated sulphuric acid, characterized by adding to the said solution a solution of at least one other salt of hafnium and zirconium in a dilute acid.

6. A process according to claim 1, characterized in that the other salts of hafnium and zirconium are obtained by introducing hafnium phosphate and zirconium phosphate into a medium containing hydrofluoric acid, precipitating from the solution thus obtained the oxides of hafnium and zirconium by means of a basic reacting substance and converting the said oxides in an acid medium into other salts of hafnium and zirconium.

In testimony whereof I affix my signature, at the city of Eindhoven, this 21st day of July, A. D. 1926.

JAN HENDRIK de BOER.